United States Patent
Vilhena Da Maia De Sá E Meneze et al.

(10) Patent No.: US 12,008,362 B2
(45) Date of Patent: Jun. 11, 2024

(54) SOFTWARE DEVELOPMENT ENVIRONMENT

(71) Applicant: MCKINSEY & COMPANY, INC., New York, NY (US)

(72) Inventors: Pedro Miguel Vilhena Da Maia De Sá E Meneze, Rio de Janeiro (BR); Andreas Raggl, Schindellegi (CH); Ryan Edward Luque Maas, Mountlake Terrace, WA (US); Andreas Kremer, Berlin (DE); Frank Rainer Alfons Herbert Gerhard, Zwiefalten-Gauingen (DE); Pankaj Kumar, New York, NY (US); Marie-Paule Laurent, New York, NY (US); Michelle Atwood, New York, NY (US); Justin Lee Gibbs, San Jose, CA (US)

(73) Assignee: MCKINSEY & COMPANY, INC., New York, NY (US)

(*) Notice: Subject to any disclaimer, the term of this patent is extended or adjusted under 35 U.S.C. 154(b) by 0 days.

(21) Appl. No.: 18/171,094

(22) Filed: Feb. 17, 2023

(65) Prior Publication Data
US 2023/0266965 A1   Aug. 24, 2023

Related U.S. Application Data

(60) Provisional application No. 63/311,848, filed on Feb. 18, 2022.

(51) Int. Cl.
| | |
|---|---|
| G06F 8/71 | (2018.01) |
| G06F 8/41 | (2018.01) |
| G06F 8/73 | (2018.01) |

(52) U.S. Cl.
CPC ............ G06F 8/71 (2013.01); G06F 8/42 (2013.01); G06F 8/49 (2013.01); G06F 8/73 (2013.01)

(58) Field of Classification Search
CPC ..... G06F 8/42; G06F 8/49; G06F 8/71; G06F 8/73
See application file for complete search history.

(56) References Cited

U.S. PATENT DOCUMENTS

| | | | |
|---|---|---|---|
| 10,565,093 B1* | 2/2020 | Herrin | G06F 8/77 |
| 2020/0257514 A1* | 8/2020 | Gadgil | H04L 67/34 |

(Continued)

*Primary Examiner* — Marina Lee
(74) *Attorney, Agent, or Firm* — Volpe Koenig (57) ABSTRACT

Systems and methods for managing software resources such as machine learning/artificial intelligence models. The system includes a number of components that provide versioning services to both software resources and to data sets. A data storage component also addresses storage/retrieval functions for the system. A user interface element is also present to provide users with both a GUI and a command line interface. An assessment element assesses user selected software assets for project inclusion, with the assessment being based on good software development principles and practices. Once a project of selected software assets has passed the assessment stage, the software assets are pipelined for execution by an execution unit. The outputs of the execution unit are sent to a data output module automatically populates predetermined and preconfigured templates with the outputs to produce reports. The outputs may be final outputs or they may be intermediate results produced by the software assets.

22 Claims, 2 Drawing Sheets

(56) References Cited

U.S. PATENT DOCUMENTS

| | | | |
|---|---|---|---|
| 2021/0263949 A1* | 8/2021 | Cox | G06N 3/084 |
| 2022/0036232 A1* | 2/2022 | Patel | G06F 8/60 |
| 2023/0027810 A1* | 1/2023 | Pokorny | G06F 8/71 |

* cited by examiner

SOFTWARE DEVELOPMENT ENVIRONMENT

CROSS REFERENCE TO RELATED APPLICATION

This application claims the benefit of and priority to U.S. Provisional Application No. 63/311,848, filed Feb. 18, 2022, entitled SOFTWARE DEVELOPMENT ENVIRONMENT, the contents of which are hereby incorporated by reference as if fully set forth herein.

TECHNICAL FIELD

The present invention relates to software resources. More specifically, the present invention relates to systems and methods for the management of software resources such as machine learning models, artificial intelligence based software modules, sections of code, data used in training machine learning models, and documentation relating to such software resources.

BACKGROUND

There has been an explosion in the advancement of artificial intelligence based fields such as machine learning in the past decade. This has led to not only an interest in such fields but in the adaptation and increasing use of such technologies in everyday lives. To this end, many institutions and businesses have delved into developing software resources that leverage such technologies.

Unfortunately, this increase in interest and application of such technologies has outstripped the development and spread of good practices in the creation/development of machine learning/artificial intelligence models. Accordingly, some machine learning/artificial intelligence model projects may result in inadequate documentation, insufficient linkage between data sets used to create the projects, and lack of versioning in terms of code, data, and documentation.

There is, therefore, a need for systems and methods that automatically implement good software development practices on machine learning/artificial intelligence developers and on machine learning/artificial intelligence projects. Preferably, such systems and methods can leverage existing tools to thereby accelerate not just the implementation of such systems and methods but also their adoption.

SUMMARY

The present invention provides systems and methods for managing software resources. The system includes a number of components that provide versioning services to both software resources (such as code and documentation) and to data sets. A data storage component also addresses storage/retrieval functions for the system. A user interface (UI) element is also present to provide users with both a GUI and a command line interface. An assessment element assesses user selected software assets for inclusion into a project, with the assessment being based on, among other criteria, good software development principles and practices. Once a project of selected software assets has passed the assessment stage, the software assets are arranged for execution by an execution unit. The outputs of the execution unit are sent to a data output module that uses the outputs to automatically populate predetermined and preconfigured templates to produce reports from the project. These outputs may also be stored for later analysis and/or reporting if desired. The outputs may be final outputs for the project as a whole or they may be intermediate results produced by one or more specific software assets.

In a first aspect, the present invention provides a system for managing software resources, the system comprising:
at least one component for providing versioning related services for said software resources, said software resources including software assets and documentation relating to said software assets, said versioning related services being to ensure that different versions of said software resources are differentiated from one another;
a data storage component for data storage related services for storing and retrieving said software resources;
a user interface element for providing user interface services to a user, said user interface services being at least for selecting or creating at least one software asset to be included in a project;
at least one assessment element for assessing user created or user selected software assets that have been selected for said project, said at least one assessment element assessing said software assets based on predetermined criteria; and
a plurality of execution units for executing software assets selected for said project;
wherein
said execution units produce outputs for use by a data output module;
said software assets selected for said project are sequentially pipelined for execution by said at least one of said plurality of execution units; and
said software assets selected for said project are retrieved from storage by said data storage component.

In one implementation, the at least one component for providing versioning related services comprises a resource versioning component for ensuring that documentation and code relating to specific software assets are versioned and a data versioning component for ensuring that data sets relating to specific software assets are versioned. As well, the execution units provide intermediate results from pipelined software assets to the data output module.

In one variant, the outputs from said execution units are inserted into predefined templates by the data output module. The outputs from the execution units may be stored in a database by said data output module for later analysis and/or reporting.

In another variant, the predetermined criteria includes at least one of: conformity with established software development practices; viability of the project to be able to be executed by the execution units; data matches between a first software asset's output and an immediately succeeding software asset's input; and correct language syntax for a specific computer language. Other criteria may also be used.

In another implementation, the at least one component for providing versioning related services interfaces with at least one external application to provide the versioning related services. Additionally, the data storage component interfaces with at least one online storage service for storage and retrieval of software resources for the system.

In the system of the invention, the at least one component for providing versioning related services provides alerts and notifications with the alerts and notifications to a user relating to different versions of software resources. These alerts and notifications may include queries about whether a specific software resource is to be assigned a new version number.

It should be clear that the software assets include modularized software code blocks. These software assets are executable by the execution units regardless of the computer language of the source code of the software assets.

As well for the system, the user interface element provides a command line interface to the user. The user interface element may also provide a graphical user interface.

For ease of reference, retrieval of a software asset through the data storage element causes an automatic retrieval of documentation associated with the software asset being retrieved.

In another aspect, the present invention provides a method for producing outputs from an execution of at least one software asset, the method comprising:
  a) receiving input from a user, said input including an indication of a selection of at least one software asset to be included in a project; said at least one software asset being a modularized software asset;
  b) retrieving said at least one software asset from storage;
  c) arranging said at least one software asset with other software assets in a project, said software assets being arranged for execution by an execution unit;
  d) causing said sequential execution by said execution units of said software assets; and
  e) producing at least one output from said execution unit, said at least one output being from at least one of said software assets.

The method may also include the step of automatically using the at least one output to populate at least one predefined template to produce at least one report. The method may also include the step of automatically storing the at least one output for later analysis and/or reporting.

In the method, the at least one output may be an intermediate output from at least one software asset in the project. As well, in the method, prior to step d) and subsequent to step c), the project is assessed according to predetermined criteria. The method may only proceed to step d) only if the project conforms to the predetermined criteria.

In a further aspect, the present invention provides computer readable media having encoded thereon computer-readable and computer-executable instructions that, when executed, implement a method for producing outputs from an execution of at least one software asset, the method comprising:
  a) receiving input from a user, said input including an indication of a selection of at least one software asset to be included in a project; said at least one software asset being a modularized software asset;
  b) retrieving said at least one software asset from storage;
  c) sequentially pipelining said at least one software asset with other software assets in a project, said software assets being arranged for sequential execution by an execution unit;
  d) causing said sequential execution by said execution units of said software assets; and
  e) producing at least one output from said execution unit, said at least one output being from at least one of said software assets.

BRIEF DESCRIPTION OF THE DRAWINGS

The embodiments of the present invention will now be described by reference to the following figures, in which identical reference numerals in different figures indicate identical elements and in which.

DETAILED DESCRIPTION

In one aspect of the present invention, there is provided a system for managing software resources such a code, documentation, and data. The system operates to ensure that proper versioning practices are followed for all aspects of software resources such that code, documentation, and data are all properly versioned. As well, the system operates to ensure that any code generated by a user using the system is properly documented and that versions of the code and its documentation are properly stored for potential reuse. For machine learning/artificial intelligence projects, the data used to generate models are also properly documented, versioned, saved, and linked to the relevant models. Thus, data sets that were used to create/engineer/validate specific models are linked with their associated models along with any relevant documentation, thereby ensuring accountability and traceability for anyone wishing to use/adjust either the models or the data. In addition to this, the system allows users to access previously produced software assets such as models, modules, code sections, code segments, code blocks, and other such software assets from a suitable repository for reuse, regardless of the form of the software asset. Users can therefore use these software assets to create projects or collections of software assets that, when arranged and executed, produces a suitable result for the user. Software assets are therefore modularized and can be downloaded and used in a suitable project. To correct potential issues with any project, the system also performs data checks and compatibility between the software assets selected by a user for a project, as well as qualitative and quantitative assessments of projects. Thus, as the user aggregates selected or user written software assets, the system ensures that each standalone software asset's outputs are compatible with a selected subsequent software asset's inputs. This ensures data compatibility between selected software assets. As the system checks compatibility between various software assets in a project, the system also ensures that the project, as well as any software assets generated by the user, conforms to well-established industry norms and practices with respect to documentation, versioning, proper code and project management, as well as well-established qualitative and quantitative industry norms.

After a project's software assets have been selected and after the system has ensured that the project's software assets are compatible with one another and are properly versioned and documented, the system can then arrange (and/or pipeline) the various selected software assets for execution. Once arranged, the system can then execute the project and generate suitable outputs. It should be clear that the system's outputs for a project may not only involve a final end result for a project but also intermediate results from one or more of the software assets used in the project. The results from a project are output from the system and are then received by a data output module. The data output module receives the data output of a project and, using preconfigured templates, generates reports for the project. The reports may include the final output of the project as well as intermediate results from the various software assets used in the project. This allows users to track not just a project's end result but how that end result progresses through a project's pipeline. Additionally, the output data can be used as telemetry to monitor/analyze one or more projects. The output data can thus be stored as telemetry for assessment (whether as a later analysis or in real-time analysis) or it can be stored and used in the above noted preconfigured templates.

The system therefore allows users to create new projects and new software assets that conform to accepted software industry practices. For ease of implementation and to ensure widespread acceptance of the system of the present invention, the system may be configured to take advantage of or to leverage pre-existing online services and products. This ensures that users are provided with the guarantee that well-known and tested services form part of the functionality of the system.

It should be clear that the various aspects of the present invention may be used with any number of models in any number of model domains. Such aspects of the present invention are not limited to machine learning/artificial intelligence models/projects but can also be used/applied to other target models such as machine learning/artificial intelligence models, statistical/regression models, or quantitative models in general. The present invention may thus be used for software assets that are used in different model domains including credit risk, market risk, machine learning/artificial intelligence, non-financial risk models, etc. The present invention may also be used by those involved in the various stages of a model life cycle and not just by model developers in model development. Thus, the present invention may be used by validators, model owners, those who maintain and monitor models, and others who are involved in the entire model life cycle.

Figure 1:
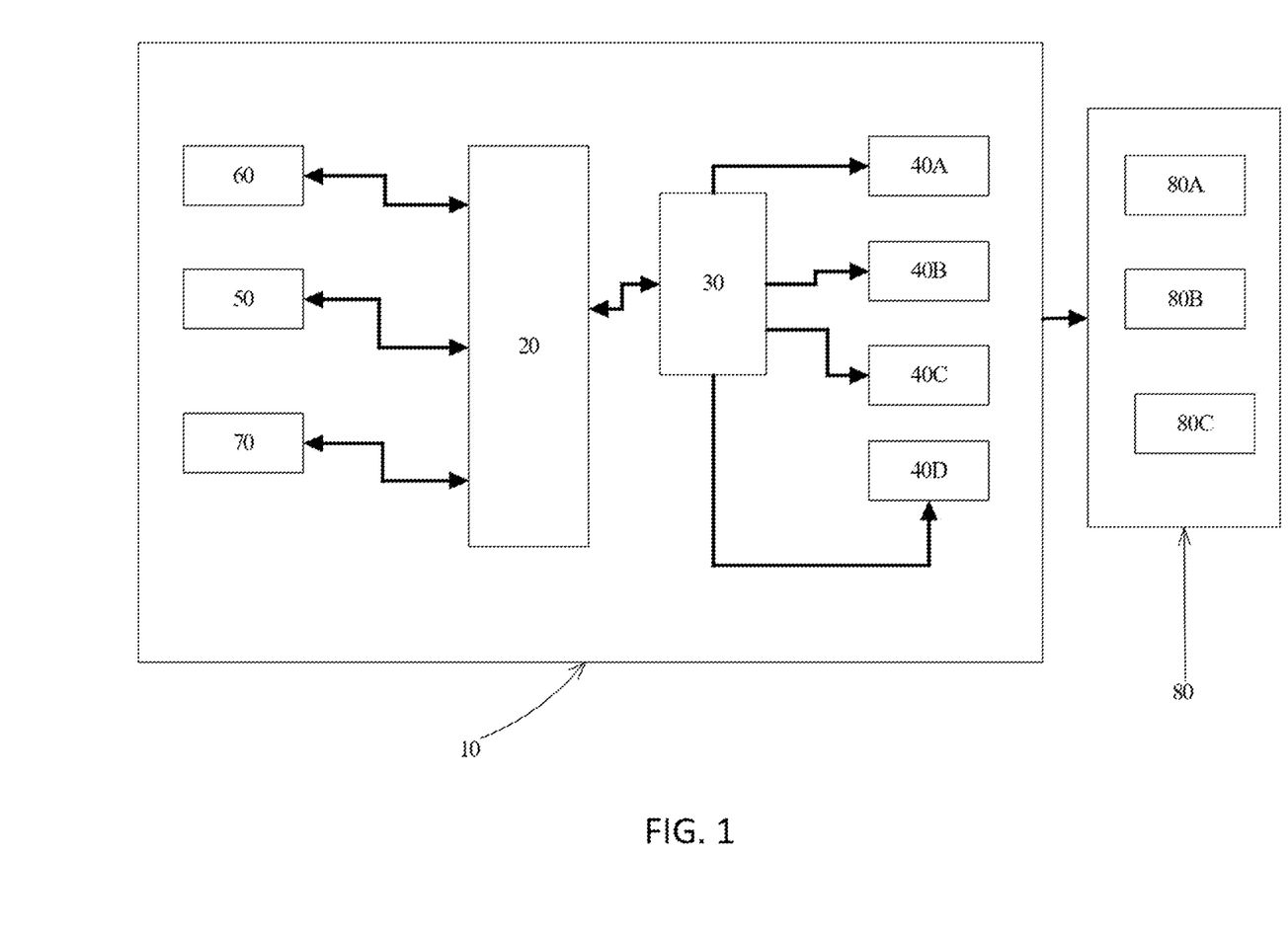
FIG. 1 is a block diagram of a system according to one aspect of the present invention.

Referring to FIG. 1, a block diagram of one implementation of an aspect of the present invention is illustrated. As can be seen, the system 10 includes a UI (user interface) element 20, an assessment element 30, a number of execution units 40A-40D in parallel, as well as a data versioning component 50, a resource versioning component 60, and a data storage component 70. The outputs of the various parts of the system are sent to a data output module 80.

In operation, a user, by way of the UI element 20, creates a project for execution by one of the execution units 40A-40D. The user can select multiple software assets such as modules, trained models, snippets of code, or other types of code that can be compiled and executed. These software assets are stored using the data storage component 70 and are retrieved using the same component. Pre-existing documentation for the selected software assets can also be retrieved from suitable storage media using the same data storage component. The user can then rearrange the selected software assets or can write/train his or her own software assets as necessary. Once software assets have been selected or compiled, the project is assessed by the assessment element 30. This assessment element 30 ensures that the project conforms to predefined and precoded software development practices and norms. Thus, in one aspect, the user is prompted and queried to provide suitable documentation for the various stages of the project. The documentation and the code generated by the project (regardless of whether the resulting code is a conglomeration of pre-existing software assets or is a newly written segment of code or a mix of the two) is stored and versioned as necessary by the resource versioning component 60 and by the data storage component 70. At suitable stages of development of the project, the resource versioning component 60 can, either automatically or manually (depending on the configuration of the system), produce versions of the project and/or of any code being written/compiled, along with any suitable documentation. Should the project and/or any software asset that the project uses require training using one or more specific sets of data, these specific sets of data are tagged with specific version numbers and are associated with the specific version of the project and/or code as necessary. The versioning of the data is handled by the data versioning component 50.

In addition to ensuring that the various software assets used in a project conform to suitable software development practices, the assessment element 30 also checks to ensure that the various software assets are suitably compatible with one another. As an example, if there is a data type mismatch between one software asset's outputs and an immediately subsequent software asset's inputs, such a mismatch would be flagged to the user and the project would be placed on hold until the user has addressed the issue.

It should also be clear that the assessment element 30 may comprise multiple elements or sub-elements that perform multiple assessment functions. The one or more assessment elements 30 (and/or assessment sub-elements) are used to perform qualitative and/or quantitative assessments of the various software assets involved in the system. The assessment elements 30 perform quantitative assessments by way of a series of statistical tests, sensitivity analysis, bias detection algorithms, etc. Qualitative assessments are, in one implementation, performed by way of expert assessment along multi-dimensional assessment questionnaires and scoring sheets. The sub-components of the assessment element 30 provides access to codified test repositories for quantified testing as well as codified qualitative assessment standards for different model domains (e.g., credit risk, market risk, ML/AI, non-financial risk models, etc.). These assessments can be performed automatically or, depending on the implementation, launched manually by a user.

Once a project is complete and has passed the assessment element's tests, the various software assets are arranged in the order set by the user and are then sent to an execution unit for execution. The user can configure the various software assets to output intermediate results to the data output module along with the final result of the execution unit. The user can also configure the data output module to use specific preconfigured templates to be populated by the final result and/or by the intermediate results from the various software assets. This allows for the automated generation of reports for the results, both final and intermediary. As well, this allows for automated storage and/or reporting of telemetry data from the various software assets being executed.

It should be clear that software assets can be arranged in whatever order the user may wish. As such, software assets may be arranged in a pipelined manner (i.e. in a sequential order), in a parallelized manner (i.e. multiple software assets being executed simultaneously in parallel), or in a pipelined parallel manner (i.e. parallel groups of software assets that are pipelined or arranged for sequential execution).

Regarding implementation, some of the components may be implemented using currently existing online services. Alternatively, some of these components may be implemented by purposely configured and architected software assets.

As an example of the above, the resource versioning component may be implemented by architecting a software application that, in the case of a software asset being amended and which already has a stored version, compares the software asset in storage with the version of the being amended. Once a certain amount of the software asset has been adjusted/amended, the user can be prompted to save the amended version as a new version. To allow for collaboration between different users, versioning protocols can be built into the resulting software application so that multiple users can simultaneously access and edit/amend the same resource without corrupting the version that is being worked on by others. It should be clear that the resource versioning component can perform these tasks not just for software assets and projects overall but for their documentation as well.

For a different implementation, the resource versioning component can be architected to interface with one or more existing applications that provide similar versioning functions. As examples, these existing applications may include Git, Bitbucket, GitLab, and Microsoft's Team Foundation Server. Other tools and applications with similar capabilities may also be used.

For the data versioning component, similar considerations as for the resource versioning component may apply. As can be imagined, while the data versioning component is relevant for all target models, the data versioning component is particularly relevant to machine learning/artificial intelligence related projects or software assets as these projects/software assets can be very data intense and may need to go through many iterations of data treatment and training. The data versioning component versions and/or stores projects and/or software assets that use specific data or data sets in their creation and/or maintenance. As an example, a specific software asset may be a machine learning model that is trained using a specific data set. That specific machine learning model trained on that specific data set is stored and associated with one another. Another instance of the same machine learning model but trained on a different data set would be stored and referenced as a different version of the initial model. This second data set and its trained model would both the associated with each other and may be saved and referenced as a different version of the earlier initial model and data set. Thus, an initial data set may be saved and referenced as a source and pruning, adding, or otherwise amending this initial data set would generate a data set that is referenced and saved as a different version of that initial data set. Such versioning of these data sets would, of course, be the function of the data versioning component.

In terms of implementation, the data versioning component may be implemented by architecting a versioning application using similar considerations as with the resource versioning component. For such an application, suitable versioning protocols and measures to allow for collaborative working between different simultaneous users would be used. Alternatively, for faster implementation, the data versioning component can be configured to interface with existing applications/tools such as Data Version Control or tools with similar capabilities and functions.

For the data storage component, in one implementation, this component can be configured to interface with suitable data storage such as networked drives and/or cloud storage. It should be clear that the data storage component attends to the storage and retrieval of not just the software assets but also of the data used in the creation and/or configuration of these software assets. Thus, when a user needs a pre-existing software asset and/or the data used by that software asset, the data storage component interfaces with the data storage that stores the relevant asset and/or data and retrieves that asset/data. It should be clear that the data storage component can include database capabilities that may be integrated with the resource versioning component and the data versioning component. Such integration allows users to select data and/or software assets from the relevant component and have the data and/or software assets to be retrieved automatically by way of the data storage component.

In one implementation, the data storage component's database capabilities provide a user with a list of available software assets for use. This listing is cross-referenced and cross-linked with entries from the resource versioning component to ensure that each version of a resource (whether the resource is a software asset or documentation) is properly referenced in the database. In addition, each relevant database entry for a software asset is also cross-referenced and cross-linked with relevant data blocks and data block versions as detailed by the data versioning component. This cross-referencing and cross-linking allows users to download each software asset/documentation/data directly from a relevant database entry. Thus, a user wanting to retrieve a software asset and the data set that was used to create/train that software asset simply needs to access the database, select the relevant software asset from the database listing, select the cross-referenced version of the relevant data set for that software asset, and download both the software asset and the correct version of the data set. It should be clear that, when retrieving a software asset, the data storage component may also automatically download the relevant documentation for that software asset. This ensures that a user wanting to use a specific software asset will be automatically provided with that software asset's documentation.

In one implementation, the data storage component may be configured to interface with suitable cloud data storage solutions such as Amazon S3, Google Cloud, Apache Hadoop, and Microsoft's Azure. Other cloud data storage solutions and products may, of course, be used.

For the UI element of the system, this element may be implemented as both a GUI (graphical user interface) or a CLI (command line interface). As a GUI, the UI element can cooperate and work with the components of the system to give the user a suitable GUI environment. As such, a suitable menu based or icon based user interface may be used and the contents of the database of available software assets may be presented as specific icons, with each icon representing a specific software asset. For ease of use, the UI element may be configured to allow the user to select software assets as icons and then to drag and drop these icons together to thereby link software assets to one another. Of course, if there is a mismatch between software assets that are to be linked, this mismatch is flagged/alerted to the user. Other software assets may be used to bridge data mismatches between software assets, depending on the available software assets and on the data mismatch.

In some implementations, the UI element of the system may also be provided to the user as an IDE (integrated development environment), complete with a suitable text editor, syntax checker, and other features that are available to other existing IDEs. Of course, the IDE may use different components to ensure that the IDE is usable across different programming languages and environments. As can be imagined, the UI element can be used to create code that can be saved as a software asset to be saved and used in one or more suitable projects.

In parallel with the GUI and the IDE of the UI element, the UI element may also be provided with a CLI (command line interface). Depending on the user's needs, a CLI may be more suited for circumstances that include launching projects, linking software assets, and other tasks where the files are either known or have already been downloaded from data storage.

In terms of implementation, various aspects of the UI element may be implemented using tools, frameworks, and environments such as Node.js, Next.js, and other similar tools and environments. The UI element's CLI environment may be implemented using Node.js, DVC, Pandoc, and Python.

Once a user has selected software assets for a project and have properly linked these software assets to one another and have provided data for the project, the project is then passed from the UI element to the assessment element 30. The assessment element 30 assesses each project and determines if the project conforms to predetermined and accepted software engineering practices that affect documentation, code readability, and code reproducibility. As well, the assessment element 30 assesses the project for data mismatch (especially between successive software assets), code/project correctness (i.e. whether the code or the project will actually run/execute), and other potential issues that may be encountered when the project is executed. Such issues or potential issues are then flagged and brought to the user's attention by the assessment element. The user can then decide to address the potential issues or override the assessment element's concerns.

From the above, it should be clear that, in one aspect, the assessment element operates to determine if the project will work—i.e., will the user's selected software assets work with one another to produce a result. If the assessment element's assessment determines that the various software assets will be executable with one another and that the user's configuration for the sequence of modularized software assets to be pipelined will not have syntax issues, data issues, or other errors that will prevent the sequence of assets from executing, then the assessment element will pass the project to a suitable execution unit for execution.

In addition to the assessment element's assessment of a project's viability as a functioning project (i.e., will the project run), the assessment module will also assess the project for conformity to proper software engineering principles. A new software asset written by the user for a project will be assessed for proper documentation and, if such documentation is not detected, the user will be alerted. Naming conventions for objects within newly created code may also be assessed, with a view towards creating code that is readable and understandable by those other than the coder. Other suitable software engineering or software development principles may also be coded into the assessment element's checks to ensure that such principles are adhered to or that, at the very least, the user is well-aware of the potential hazards of ignoring such principles. This may take the form of informational pop-ups and other informational alerts if issues or potential issues are detected in a project. Of course, a user may simply bypass such warnings if desired.

After a project has passed the assessment element's test, the assessment element can automatically configure an execution unit to execute the project. Alternatively, the user can provide configuration parameters to the project so that a suitable execution environment can be provisioned for the project.

Regarding the execution units, each execution unit can be implemented as a separate operating environment, with suitably provisioned storage and memory, for executing a project. Multiple execution units can be provisioned and used for multiple projects as needed by the user, with each execution unit being self-contained and insulated from other execution units or other projects. As can be imagined, each execution unit is provisioned with suitable resources to properly execute/run the various software assets in a given project.

For clarity, the system, as a whole, renders the original programming language of a software asset to be immaterial. In one implementation, the execution unit is provisioned with the resources (e.g. multiple compilers or interpreters as needed) to be able to run the various software assets in a given project. Thus, in one example, a given software asset written in Python is interpreted by the execution unit using specific data as detailed by the user. The output is then passed on to a second software asset, written in C, that has been compiled and which uses the Python asset's output as its input. The second software asset is executed and its output is then passed on to a third software asset and so on and so forth. The workflow in a given project may be defined by the user in a YAML file or in any other suitable format. It should also be clear that, when properly configured as such by a user, the outputs from the different software assets may be passed on to the data output module.

Regarding the data output module 80, the module may be implemented as having three major components—a front end 80A, a back end 80B, and a database 80C. As can be imagined, the outputs received from the various execution units of the system are received by the back end and are stored in the database. These outputs may be used to populate preconfigured reports that are then delivered to the user by way of the front end. Of course, the outputs from the execution units are tagged with relevant information when sent to the data output module including which software asset(s) were used in producing the output (with links to the software assets), which data sets were used (and the output is linked to the data set as stored), indications whether the output is an intermediate output or a final output, the user running the project, an identification of the project (as well as links to the documentation for the project as well as to the project itself as stored), the version of the project, the versions of the software assets used in producing the output, as well as other relevant data points for the output. Other data may also be output from the execution units such as user defined model/software asset metadata, metrics for the software assets, thresholds, and version information. This data and the output itself are stored in the database and are associated/linked to the software assets and to the project. As noted above, the output data is then used to populate predefined and preconfigured templates to produce reports for the user.

As an alternative, the data output module may store the outputs, whether intermediate or final, from the project in the database. These outputs can then be analyzed as telemetry from project as the various software assets are executed. The analysis may, of course, be performed post execution or while the software assets are running.

When using the data output module to automatically create reports, it should be clear that, prior to finalizing the project for execution by an execution unit, the user can preconfigure a predefined template using the data output module. One or more templates may be configured to receive final outputs from a project while other templates may be configured to receive intermediate results. As should be clear, intermediate results are output from a software asset that is pipelined within a specific project. Thus, intermediate results allow a user to view how a software asset is performing within the context of the project and such intermediate results can be analyzed as telemetry from the software assets as they are executed. Other metrics from specific software assets or from the project as a whole can also be output from the execution unit and can be used to populate one or more suitable templates.

For the reporting function of the data output module, the data output module can be configured to operate with various existing software packages and tools. As such, the output of the data output module can be configured to operate with a multitude of products including Microsoft products (including Microsoft Word and Microsoft Excel and the Microsoft Office suite), LaTeX, Pandocs, and can be configured in various formats including HTML 5.

As noted above, the data output module can be implemented using three major components—a front end, a back end, and a database component. The front end component can be implemented using nodejs or Next.js or any product or service with similar capabilities. The backend can be implemented using GraphQL or a similar product. Finally, the database component can be implemented using PostgreSQL or the like.

In one use case, the system of the present invention allows a number of efficiencies and advantages to be availed of by teams of developers operating in the field of, for example, machine learning and AI. The system allows for consistent reuse of software codes or blocks that have been previously validated. As well, the system allows these developers access to the data sets that have resulted in these blocks of code. The performance results from these modularized software assets can therefore by reproduced and/or recreated as the software asset's code and the data sets used for the software asset are available. In addition, the system cuts down on the time needed for report preparation as the results from the execution of a project, as well as the execution of software assets within that project, can be automatically piped to a suitable template. The intermediate result reporting also allows developers to track how a project is executed at its various stages—instead of a black box approach, the developers can see the data flow and the result flow that results from one or more of the software assets in the project.

In another use case, the system allows users and developers to test projects using different data sets. As well, the configurability afforded by the system allows developers to insert software assets into already defined projects to test the viability of such software assets in those projects. This configurability provides users with a toolbox of preconfigured software assets as building blocks to create new projects. Of course, the user can also create their own software assets using the system and such new software assets can be stored in the database for reuse by other users in their projects. The versioning capabilities of the system also gives teams of developers the flexibility to create forks from a main projects and allows other users to trace the roots of a fork to the original main project.

Figure 2:
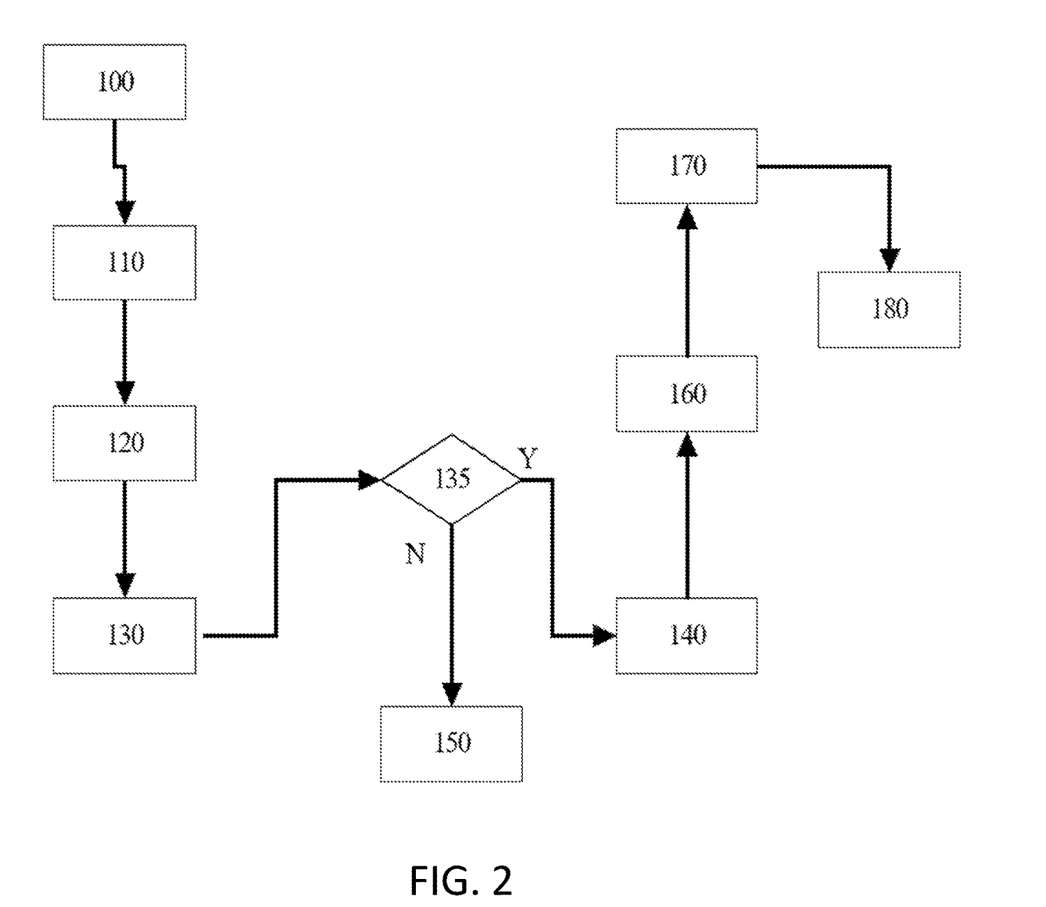
FIG. 2 is a flowchart detailing the steps in a method according to another aspect of the present invention.

In another aspect, the present invention provides a method for producing an output from a project of user selected software assets that have been pipelined for sequential execution by an execution unit. The steps in the method are outlined in the flowchart of FIG. 2. The method begins in step 100, that of receiving input from a user. The input includes an indication that one or more software assets have been selected for inclusion in a project. Step 110 is that of retrieving the software assets selected. In the present invention, this retrieval is accomplished by the data storage component while step 100 is accomplished using the UI element. After the software assets have been retrieved, these are then pipelined for sequential execution by one of the execution units (step 120). However, prior to executing the software assets in the project, the project is assessed by the assessment element (step 130). As noted above, the assessment is performed in light of predetermined criteria, with the predetermined criteria including at least accepted software engineering principles and practices, good software development practices, the viability of the project to be executed by the execution unit, data matches/mismatches between successive software assets, and computer language syntax. For decision 135, that of determining whether the project passes the assessment or not, if the project conforms to the predetermined criteria (i.e., there are no problems with the project and the software assets selected), then the project is dispatched to the execution unit (step 140). If, from decision 135, the predetermined criteria is not adhered to, then the project is sent back to the user with suitable notifications and alerts regarding the shortcomings and issues (step 150). For step 160, the sequentially arranged software assets in the project are executed by the execution unit and the output is sent to the data output module (step 170). The output is then automatically used to populate predetermined templates generated by the data output module (step 180). As noted above, the output can be final outputs or they can be intermediate results from the software assets in the project.

It should be clear that the various aspects of the present invention may be implemented as software modules in an overall software system. As such, the present invention may thus take the form of computer executable instructions that, when executed, implements various software modules with predefined functions.

Additionally, it should be clear that, unless otherwise specified, any references herein to 'image' or to 'images' refer to a digital image or to digital images, comprising pixels or picture cells. Likewise, any references to an 'audio file' or to 'audio files' refer to digital audio files, unless otherwise specified. 'Video', 'video files', 'data objects', 'data files' and all other such terms should be taken to mean digital files and/or data objects, unless otherwise specified.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A system for managing software resources, said system comprising:
   processing circuitry in communication with at least one memory, said at least one memory having stored thereon computer-executable instructions executed by said processing circuitry, said processing circuitry thereby:
      providing, by at least one versioning application, versioning related services for said software resources, said software resources including software assets and documentation relating to said software assets, said versioning related services comprising assigning versioning information to different versions of said software resources to thereby differentiate said different versions of said software resources from each other;
      providing, by a data storage application, data storage related services for storing said software resources in a data store and for retrieving said software resources from said data store;
      providing, by a user interface element, user interface services to a user, said user interface element receiving user input that selects a specific version of one of said software assets or that creates a new version of said one of said software assets, such specific version or new version thereby being selected assets, said selected assets being for inclusion in a project, and said user interface element cooperating with said at least one versioning application to manage said specific version or said new version;
      assessing, by at least one assessment element, said selected assets, assessing being based on predetermined criteria; and
      executing, using a plurality of execution units, said selected assets said selected assets being executed in a predetermined sequential arrangement,
   wherein
      outputs for use by a data output module that is implemented by execution of said computer-executable instructions are produced by said execution units;
      said selected assets are arranged in said predetermined sequential arrangement by said at least one of said plurality of execution units;
      at least one of said selected assets is retrieved from said data store by said data storage application; and
      said at least one versioning application comprises:
         assigning, by a resource versioning component, said versioning information to documentation and to code relating to said software assets, and
         assigning, by a data versioning component, said versioning information to data sets relating to said software assets.

2. The system according to claim 1, said processing circuitry further providing intermediate results from said selected assets to said data output module by said execution units.

3. The system according to claim 1, wherein said outputs from said execution units are inserted into predefined templates by said data output module.

4. The system according to claim 1, wherein said outputs from said execution units are stored in a database by said data output module.

5. The system according to claim 1, wherein said predetermined criteria include at least one of:
   conformity with established software development practices;
   viability of said project for execution by said execution units;
   data matches between a first software asset's output and an immediately succeeding software asset's input;
   correct language syntax for a specific computer language;
   quantitative analysis based on at least one of: statistical tests, sensitivity analysis, bias detection algorithms; and
   qualitative analysis based at least on expert assessment along multi-dimensional assessment questionnaires and/or scoring sheets.

6. The system according to claim 1, wherein said processing circuitry further causes interfacing between said at least one versioning application and said at least one external application when providing said versioning related services.

7. The system according to claim 1, wherein said processing circuitry further causes interfacing between said data storage application and at least one online storage service.

8. The system according to claim 1, said processing circuitry further providing alerts and notifications to a user by said at least one versioning application, said alerts and notifications relating to different versions of software resources.

9. The system according to claim 8, wherein said alerts and notifications include queries about whether a specific software resource is to be assigned a new version number.

10. The system according to claim 1, wherein said software assets include at least one of:
    modularized machine learning models;
    modularized models relating to at least one of: credit risk, market risk, machine learning/artificial intelligence, non-financial risk models; and
    modularized software code blocks.

11. The system according to claim 1, wherein said software assets are executable by said execution units regardless of a computer language of a source code of said software assets.

12. The system according to claim 1, said processing circuitry further providing a command line interface to said user by said user interface element.

13. The system according to claim 1, wherein retrieval of a specific software asset by said data storage element causes an automatic retrieval of documentation associated with said specific software asset.

14. The system according to claim 1, wherein said assessing of said selected assets is based on at least one of:
standardized, pre-configured workflows;
standardized tests and pre-configured test plans for quantitative analysis of models; and
standardized qualitative assessments for different model domains.

15. The system according to claim 1, wherein standardized, pre-configured documentation and reporting templates for document production and report generation are applied by said data output module.

16. The system according to claim 1, wherein multiple sequential arrangements are executable in parallel.

17. A method for producing outputs from an execution of at least one software asset, the method comprising:
(a) receiving input from a user, said input including an indication of a selection of a version of at least one software asset to be included in a project, said at least one software asset being a modularized software asset;
(b) retrieving said version of at least one software asset from storage;
(c) arranging said version of at least one software asset with other software assets in a sequential arrangement such that said version of at least one software assets and said other software assets are arranged as arranged software assets for sequential execution by at least one execution unit;
(d) causing said sequential execution of said arranged software assets by said at least one execution unit; and
(e) Producing at least one output from said at least one execution unit, said at least one output being from at least one of said arranged software assets,
wherein
step (d) further triggers a creation and storing of a new version of a specific software asset related to at least one of said arranged software assets, said specific software asset comprising at least one of:
code; and
at least one data set,
said method further comprising the step of assigning versioning information to said new version to thereby differentiate said new version from other versions of said specific software asset.

18. The method according to claim 17, further including:
automatically using said at least one output to populate at least one predefined template to produce at least one report.

19. The method according to claim 18, wherein said at least one output is an intermediate output from at least one software asset in said project.

20. The method according to claim 17, further comprising the step of, between steps (c) and (d), assessing said sequential arrangement according to predetermined criteria.

21. The method according to claim 20, wherein said predetermined criteria include at least one of:
conformity with established software development practices;
viability of said project for execution by said execution units;
data matches between a first software asset's output and an immediately succeeding software asset's input;
correct language syntax for a specific computer language;
quantitative analysis based on at least one of: statistical tests, sensitivity analysis, and bias detection algorithms; and
qualitative analysis based at least on expert assessment along multi-dimensional assessment questionnaires and/or scoring sheets,
wherein said qualitative analyses are applied using multiple test repositories and qualitative assessment standards for different model domains, and
wherein said method proceeds to step (d) only when said project conforms to said predetermined criteria.

22. Non-transitory computer-readable media having encoded thereon computer-readable and computer-executable instructions that, when executed, implement a method for producing outputs from an execution of at least one software asset, the method comprising:
(a) receiving input from a user, said input including an indication of a selection of a version of at least one software asset to be included in a project, said at least one software asset being a modularized software asset;
(b) retrieving said version of at least one software asset from storage;
(c) arranging said version of at least one software asset with other software assets in a sequential arrangement such that said version of at least one software assets and said other software assets are arranged as arranged software assets for sequential execution by at least one execution unit;
(d) causing said sequential execution of said arranged software assets by said at least one execution unit; and
(e) producing at least one output from said at least one execution unit, said at least one output being from at least one of said arranged software assets,
wherein
step (d) further triggers a creation and storing of a new version of a specific software asset related to at least one of said arranged software assets, said specific software asset comprising at least one of:
code; and
at least one data set,
said method further comprising the step of assigning versioning information to said new version to thereby differentiate said new version from other versions of said specific software asset.

* * * * *